(12) United States Patent
Krijnen et al.

(10) Patent No.: US 11,446,618 B1
(45) Date of Patent: Sep. 20, 2022

(54) SYSTEM FOR MIXING GERMICIDALLY ACTIVE SOLUTIONS, ON-SITE, FOR DAIRY/AGRICULTURAL HYGIENE PURPOSES

(71) Applicant: ACEPTEC, LTD, Thorndale (CA)

(72) Inventors: Robertus T. Krijnen, Ontario (CA); Michael C. Pawlak, Middleton, WI (US)

(*) Notice: Subject to any disclaimer, the term of this patent is extended or adjusted under 35 U.S.C. 154(b) by 442 days.

(21) Appl. No.: 16/590,541

(22) Filed: Oct. 2, 2019

Related U.S. Application Data

(60) Provisional application No. 62/740,114, filed on Oct. 2, 2018.

(51) Int. Cl.
| | |
|---|---|
| *B01F 33/00* | (2022.01) |
| *A01N 59/00* | (2006.01) |
| *B01F 33/84* | (2022.01) |
| *C11D 17/00* | (2006.01) |
| *A01J 7/04* | (2006.01) |
| *A01L 15/00* | (2006.01) |
| *C11D 3/48* | (2006.01) |
| *B01F 23/45* | (2022.01) |
| *B01F 23/40* | (2022.01) |
| *B01F 25/42* | (2022.01) |
| *B01F 35/214* | (2022.01) |
| *B01F 35/21* | (2022.01) |
| *B01F 35/221* | (2022.01) |
| *A23L 5/00* | (2016.01) |
| *A23B 7/157* | (2006.01) |

(Continued)

(52) U.S. Cl.
CPC ............ *B01F 33/846* (2022.01); *A01J 7/04* (2013.01); *A01L 15/00* (2013.01); *A01N 59/00* (2013.01); *B01F 23/45* (2022.01); *B01F 23/49* (2022.01); *B01F 25/42* (2022.01); *B01F 35/214* (2022.01); *B01F 35/2112* (2022.01); *B01F 35/2211* (2022.01); *C11D 3/48* (2013.01); *C11D 17/0008* (2013.01); *A23B 7/157* (2013.01); *A23L 5/57* (2016.08); *A23V 2002/00* (2013.01); *B01F 23/483* (2022.01); *B01F 2101/24* (2022.01); *C02F 1/76* (2013.01); *C02F 2303/04* (2013.01)

(58) Field of Classification Search
CPC .... B01F 23/49; B01F 35/2211; B01F 33/846; B01F 35/214; B01F 35/2112; B01F 23/45; B01F 25/42; B01F 23/483; B01F 2101/24; A01J 7/04; A01L 15/00; A01N 59/00; C11D 3/48; C11D 17/0008; A23L 5/57; A23B 7/157; A23V 2002/00; C02F 1/76; C02F 2303/04
See application file for complete search history.

(56) References Cited

U.S. PATENT DOCUMENTS

| | | | |
|---|---|---|---|
| 2002/0064880 A1* | 5/2002 | Merten | B01F 35/8822 422/63 |
| 2012/0241045 A1* | 9/2012 | Aouad | G01G 19/24 141/83 |
| 2015/0079200 A1* | 3/2015 | Durham | A01N 59/00 210/764 |

* cited by examiner

*Primary Examiner* — Anshu Bhatia
(74) *Attorney, Agent, or Firm* — Charles S. Sara; DeWitt LLP

(57) ABSTRACT

A system for on-site production of chlorine dioxide and other sanitizing solutions is disclosed which includes a controller for measuring fluids into a measuring/mixing vessel. The measuring/mixing vessel is designed to measure and mix water with activator and base additives to create a ready-to-use cleaning solution. A drainage system is employed to transfer the ready-to-use cleaning solution into a reservoir for on-site use.

17 Claims, 2 Drawing Sheets

(51) Int. Cl.
*C02F 1/76* (2006.01)
*B01F 101/24* (2022.01)

SYSTEM FOR MIXING GERMICIDALLY ACTIVE SOLUTIONS, ON-SITE, FOR DAIRY/AGRICULTURAL HYGIENE PURPOSES

CROSS-REFERENCE TO RELATED APPLICATION

The application claims priority to U.S. Provisional Application entitled "METHOD AND APPARATUS FOR MIXING GERMICIDALLY ACTIVE SOLUTIONS, ON-SITE, FOR DAIRY/AGRICULTURAL PURPOSES," Ser. No. 62/740,114, filed Oct. 2, 2018, which is incorporated herein by reference in its entirety.

BIBLIOGRAPHY

Complete bibliographical citations to the documents cited herein can be found in the Bibliography, immediately preceding the claims.

FIELD OF THE INVENTION

The present invention relates to systems and methods for generating germicidal compositions on-site, for use in a wide variety of agricultural and non-agricultural settings, including, but not limited to: animal hygiene, e.g. pre-milking, system backflushing and post milking animal hygiene, animal facility hygiene, agricultural food production settings, veterinarian settings, medical settings and/or any setting requiring disinfection using one or more required germicidal active solutions.

BACKGROUND

Mastitis is an inflammation of the mammary gland and udder tissue and is a major endemic disease of milk-producing animals. It usually occurs as an immune response to bacterial invasion of the milk producing glands by variety of bacterial sources present in agricultural/milk harvesting settings. Mastitis is the costliest disease to the dairy industry, estimated at nearly $2 billion dollars annually in the U.S. (Schroeder, 2012).

To overcome this disease, modern milk producing facilities have employed multiple pre-milking and post-milking hygiene practices to clean, disinfect and prophylactically protect an animal from contact with disease causing organisms in its environment, or through the cow-to-cow contact that occurs during the milking process.

In dairy farm milk harvesting facilities, dairy animals are commonly treated with antimicrobial solutions prior to, and/or after the milk harvesting process. These solutions are generally known within the industry as "teat dips." The prior-to-milking solutions are commonly referred to as "pre dips," and the after-milking harvesting solutions are commonly referred to as "post dips." While dairy producers may sometimes use the same product for pre-milking and post-milking disinfection, these solutions generally are developed, produced and sold separately. Each process, pre-milking disinfection and post-milking disinfection, has significant differences in its application, is therefore generally developed and produced separately.

In the pre-milking process, the cleaning and sanitizing of teats before attaching the milking machine is a very important step in preventing bacteria from getting into the teat canal and milk producing glands during the milking process. Environmental organisms such as *Streptococcus uberis*, *Streptococcus dysgalactiae* and the coliforms (*E. coli*, *Klebsiella* and *Enterobacter*) are in the soil and manure and are commonly found on the teat ends and teat skin surfaces. These contaminants must be cleaned off and the bacteria killed before attaching the milking unit. If they are not, there is always a strong possibility that bacteria could be forced into the teat/milking producing glands during the milking process, resulting in new intermammary infections (IMI's). The common pre-milking teat dip solution elements needed are "fast kill/wide spectrum" germicidal agents and cleaning surfactants in a diluted aqueous solution.

In the post-milking application, the solution of disinfecting agents provides a prophylactic barrier against bacteria entering the milk-producing glands after the milking process. The individual cow teat sphincter muscles remain open for a period after the milking process is completed. Germicidal solutions are applied to the individual teats immediately after the milking cluster is removed from the cow to:
1. Seal the teat and protect against bacteria entering the cow teats from the open sphincter muscle; and
2. Coat the teat with germicidal and skin conditioning agents that will keep the teat skin healthy and free of contagious and infectious disease-causing organisms.

This difference in application requires a substantial difference in the formulation components. The post milking solutions, by the nature of the solution, generally require a higher germicidal content to continue to protect over a longer period after application. The post-dip formulation also requires teat coating and teat skin conditioning agents. These agents are not used in optimum pre-milking formulations.

90+% of the pre- and post-milking formulations fall in the classification of oxidizers as the general source of disinfection properties. Oxidizing agents act by oxidizing the cell membrane of micro-organisms, which results in a loss of structure and leads to cell lysis and death. Chlorine and oxygen are strong oxidizers, so their compounds are primary compounds within this group. Other oxidizing agents used for pre- & post milking hygiene are: iodines, sodium hypochlorite, peroxides and peracetic acid and chlorine dioxide. These compounds are generally diluted at their place of manufacturing, and additional agents are added to the formulations to aid in cleaning or as skin conditioning agents. It is typical that these products are comprised of 90%+ of water, making the packaging and shipment of these compounds more expensive.

Chlorine dioxide is a chemical compound with the formula $ClO_2$. This yellowish-green gas crystallizes as bright orange crystals at −59° C. As one of several oxides of chlorine, it is a potent and useful oxidizing agent. In that it is produced as a gas, it must be produced on-site due to the stability of the gas produced. Thus, chlorine dioxide gas is not handled in concentrated form, but is almost always handled as a dissolved gas in water in a concentration range of 0.5 to 10 grams per liter. In many countries, such as the United States, chlorine dioxide gas may not be transported at any concentration and is almost always produced at the application site using chlorine dioxide mixing systems/generators, or manually.

Chlorine dioxide based pre/post milking teat disinfectants represent approximately 8-10% of the U.S. teat dip market, with the pre-dip representing approximately 6% and the post dip representing approximately 12% of the market use. This market is dominated by iodine-based products, representing approximately 60% of the market volume. Chlorine dioxide dips have been proven to be extremely effective as both pre and post milking in protocol evaluations created by the National Mastitis Council (NMC), and have been shown to be equal to, or statistically significantly superior in reducing new IMI's in comparison to iodine formulations. Chlorine dioxides have several characteristics that have subjugated the formulations to a lower market share position:

1. The activator/base formulations must be mixed on-site, in the vicinity of use, and lack mixing systems/devices that are accurate, consistent and affordable;
2. The current activator/base formulations are pre-packaged, and used primarily as post dip configurations due to the higher costs of the formulations due to handling and packaging; and
3. The short shelf life of the on-site produced product, particularly post milking formulations, ranges between 12-48 hours, reducing the amount of product that can be pre-blended at one time.

For the purpose of producing chlorine dioxide-based teat dips/disinfection agents, most on-site applications blend pre-packaged activator and base components on farm in a 1:1 ratio. They are prepared in advance of delivery, typically in separate packaging. The low concentrations of precursor products (1-4%) means that most of the weight (96-99%) of the products consists of substantial amounts of inert, non-germicidal active ingredients, such as water, emollients and cleaning agents. This results in the need for larger product storage areas and causes increased packaging, transportation and handling costs. These costs represent over 60% of the manufactured costs of the pre-milking solutions and 40% of the costs of post milking formulas. Typically, pre-milking teat dips contain a lower level of germicidal active ingredients and skin conditioning agent. To that same point, post milking teat dips provide a higher germicidal content along with teat sealants and skin conditioning agents.

The typical shelf life of a chlorine dioxide-based formulation also plays a role in the product's limited use. The stated shelf life of these blended teat/udder hygiene products ranges between 12-48 hours, as compared to over one year for an iodine-based solution. The relative short shelf life of the chlorine dioxide produced solution is caused by two primary factors: 1) the blended solutions are not contained in sealed containers, and are thus susceptible to "gassing off" the chlorine dioxide gas, and 2) the inherent ingredients provided in the pre-packaged activator and base solutions contain non-activating components (e.g. sealing agents, surfactants and emollients) that lower the yields, time-to-use, stability, and germicidal strengths of the pre-mixed solutions.

To avoid the characteristic problems associated with chlorine dioxide use, mixing systems have been developed for use on dairy facilities that may add water to the mixing system to allow more concentrated versions of the activator and base precursor formulations. These systems use various devices to determine the amount of precursor and water to blend within the process. Some embodiments use pneumatic, vacuum-based pumping devices to pump the solutions into a mixing vessel, some use flow meters, some use static venturi-based based systems that are dependent on specified water flows and precursor viscosities, some gravimetric and require sensitive weighing devices to accurately measure a solution. For these reasons, on-site chemical mixing/blending systems have suffered from low sophistication, non-uniform mixing of the targeted chemical mixtures. Due to the high costs for accurate devices to blend singular formulations, such as post dip only, has caused low adoptions rate, leaving chlorine dioxide blending on-site to manual processes.

There are many chlorine dioxide generation reactions. However, not all of these are commercially suitable for on-site or on-farm generation of chlorine dioxide for animal or facility hygiene purposes. These types of generators are high output units typically used for water disinfection, or paper pulp bleaching operations. The following four listed are the most common chlorine dioxide generation methods (Gates, 1998):

Electrochemical: 1) Anode (oxidation): $ClO_2 \rightarrow ClO_2 + e^-$
2) Cathode (reduction): $2H_2O + 2e^- \rightarrow H2 + 2OH^-$
1)+2) (combined) $2ClO_2^- + 2H_2O \rightarrow 2ClO_2 + H_2 + 2OH^-$ Acid-Chlorite: The mixture of an acid activator (any type) with sodium chlorite. Mixing sodium chlorite solution with an acid solution, both stable as precursors, produces short-lived acidified sodium chlorite (ASC) which has potent decontaminating properties. Upon mixing the main active ingredient, hypochlorous acid is produced in equilibrium with the chlorite anion. ASC is used for sanitation of the hard surfaces and surfaces encountering food, and as a wash or rinse for a variety of foods, including red meat, poultry, seafood, fruits and vegetables. Treated properly the oxi-chlorine compounds are unstable when properly prepared, there should be no measurable residue on food. ASC also is used as a teat dip for control of mastitis in dairy cattle.

Chlorine-Chlorite: $Cl_2 + H_2O \rightarrow HOCL + HCL$ (Then refer to three chemical reaction below)

Three Chemical: $2NaClO_2 + HOCL + HCL \rightarrow 2ClO_2 + 2NaCl + H_2O$

SUMMARY OF THE INVENTION

The present invention, termed OptiBlend System, relates to liquid compositions and methods of using the liquid precursor compounds for the generation of, but not limited to, the production of chlorine dioxide sanitizing solutions and cleaners, produced on-site, in proximity to the point-of-use.

In one embodiment, the present invention is directed to an on-site system for producing sanitizing and germicidal solutions and cleaners. Specifically, the present invention is directed to an on-site system for producing at least two distinct ready-to-use product solutions, comprising a programmable logic controller, wherein the controller includes an on/off indicator switch for activating the on-site system, a plurality of pumps for pumping at least two independent precursor solutions into a first measurement/mixing vessel, and a signal control board for determining the type and amount of ready-to-use product solutions to be produced and the associated precursor solution to be pumped in the first measurement/mixing vessel. The first measurement/mixing vessel comprises a first chamber measurement vessel for receiving the precursor solutions, a second lower chamber measurement vessel for receiving water, wherein the first and second measurement vessels comprise inlets for receiving the precursor solutions and the water, an ultrasonic fill-level sensor for accurately determining and measuring the quantity of the precursor solutions and water in the first measurement/mixing vessel, an incoming water source connected to a channel tube, including a water solenoid switch, for measuring the flow of water into the first measurement/mixing vessel, and a plurality of system drain switches for releasing the ready-to-use product solutions from the first measurement/mixing vessel. The system further includes a plurality of precursor source vessels wherein each precursor source vessel contains a distinct precursor solution and wherein each precursor source vessel is connected to one of the plurality of pumps for pumping the precursor solution into the measurement/mixing vessel and a plurality of reservoirs for collecting the ready-to-use product solutions generated from the first measurement/mixing cabinet.

In another embodiment, the invention is directed to an on-site system for producing at least two distinct ready-to-use product solutions, comprising a programmable logic controller. The controller includes an on/off indicator switch for activating the on-site system, a plurality of peristaltic pumps for pumping at least two independent precursor solutions, wherein the precursor solutions comprise activator and base additives, into a first measurement/mixing vessel and a signal control board for determining the type and amount of ready-to-use product solutions to be produced and the associated precursor solution to be pumped in the first measurement/mixing vessel. The system further includes a plurality of precursor source vessels wherein each precursor source vessel contains a distinct precursor solution and wherein each precursor source vessel is connected to one of the plurality of peristaltic pumps for pumping the precursor solution into the measurement/mixing vessel, The first measurement/mixing vessel comprises a first chamber measurement vessel for receiving the precursor solutions, a second lower chamber measurement vessel for receiving water, wherein the first and second measurement vessels comprise inlets for receiving the precursor solutions and the water, an ultrasonic fill-level sensor for accurately determining and measuring the quantity of the precursor solutions and water in the first measurement/mixing vessel, an incoming water source connected to a channel tube, including a water solenoid switch, for measuring the flow of water into the first measurement/mixing vessel; and a plurality of system drain switches for releasing the ready-to-use product solutions from the first measurement/mixing vessel. The system further includes a second measurement/mixing vessel for receiving water from the water source and precursor solutions from the precursor source vessels, the system further comprising at least one auxiliary source vessel for providing supplementary solutions to the ready-to-use solution, and a plurality of reservoirs for collecting the ready-to-use product solutions generated from the first measurement/mixing cabinet, wherein each of the reservoirs comprises a float switch for measuring the current level of ready-to-use product solution in the reservoirs, wherein the float switch is in communication with the controller.

Advantageously, the present invention is designed to achieve the following key advantages over other on-site mixing systems:

1. Minimize the packaging, shipping and handling costs of products, maximizing the concentration levels of the precursors and by adding on-site water to precursor activator/base formulations of, but not limited to, chlorine dioxide hygiene formulations;

2. By its design, increase the accuracy, repeatability and safety of the system, and use of on-site blended formulations;

3. Through the development and the use of specially designed precursor formulations, can simultaneously produce multiple formulations, as an example, produce both pre and post milking teat disinfectants, simultaneously, within the same blending system; and 4. Using proprietary precursor formulations, blended on-site through the system, in a sequence that allows certain components to be blended to be in a multi-stage process that maximizes the disinfection properties of the blended precursors, and extends the shelf life of the disinfection solution by adding/not adding components that cause reduced yields, lengthen production times, shortened shelf-life, and/or reduce the efficacy of the ready-to-use (RTU) solution.

This simultaneous capability allows a facility to build/blend formulations specific to the application, without having to over produce and lose efficacy and influence the product's shelf life. The present invention combines the novel system of measuring, blending and mixing process with specially formulated precursors to maximize the advantages of on-site production use.

The present invention eliminates the issues of poor accuracy and wide product component variances by use of its novel measuring/blending process. The current invention introduces each of the specified precursor(s) into a two-stage measurement vessel, or the non-activating measurement vessel, using, but not limited to, a level control device within the measurement vessel. This accurately measures each of the components, including on-site potable water, concentrated activator and base formulations to a repeatable accuracy level of 99% or greater. Each precursor formulation is specifically tailored to its individual point of use, i.e., end product. As an example, the system can simultaneously blend a pre-milking formulation, a post-milking formulation, and/or an equipment sanitizing formulation. Unlike other on-site blending systems, the system of the present invention can simultaneously blend one or more discrete and proprietary application specific formulations for use on-site.

In some embodiments the system can blend on-site, with the use of proprietary precursors and on-site water formulations, specific to the pre-milking cleaning and sanitizing application. In some embodiments that same system can blend on-site, precursors and on-site water formulations specific to the post milking application. In some embodiments the system also can simultaneously blend multiple precursors on-site, with on-site water to create chlorine dioxide formulations either for, but not limited to, pre-milking hygiene practices, post milking hygiene practices and equipment sanitizations, all formulas and mixtures being separate and distinct. In some embodiments, each operation is kept track of in a batch format, identifying the date & time of the process, the individual batch size and volumes of each precursor component, and water, along with the tracking of the batch's individual chemical signature identified by its pH, and oxidation reduction potential (ORP) values.

Teat dips produced from the present invention can be applied and used without further mixing, storage or processing, in a range of applications that each ready-to-use (RTU) product that has been created. They may be applied, but are not limited to, being used through a pre-milking teat scrubber mechanism. They may be sprayed, dipped or foamed on to a cow's teats, specific to the formulation created.

In some embodiments the system can produce products used, but not limited to, hoof hygiene, calf hygiene, animal/facility hygiene, water treatment, vegetable and fruit washing. By reducing the costs of producing chlorine dioxide on-site, a facility dramatically lowers their overall costs of not only of producing the chlorine dioxide at a lower cost, but the costs of keeping their animals and/or products at a higher quality level.

The present invention overcomes inherent weaknesses within current processes that cause blending inaccuracies and fluctuations within the solutions produced. The current invention also can accurately and simultaneously produce one or more formulations to be used for multiple, application specific purposes, on-site. This allows multiple types sanitizing solutions to be produced in the proximity of point of use, for application specific disinfection and cleaning purposes, with a higher level of accuracy and repeatability. This capability provides dramatic savings in packaging, shipping, handling and storage costs.

The objects and advantages of the invention will appear more fully from the following detailed description of the preferred embodiment of the invention made in conjunction with the accompanying drawings.

DETAILED DESCRIPTION OF THE INVENTION

The on-site system of the present invention is capable of pre-mixing a multitude of cleaning products for use on-site, such as on a farm and specifically a dairy farm. While the system is capable of pre-mixing several distinct cleaning products, i.e., ten or more products, the system herein will be described with respect to the preparation of three distinct cleaning products. While the on-site system has application in many venues, from the farm industry to automotive or factory settings, the system herein will be specifically described with respect to cleaning products for use on a dairy farm.

Figure 1:
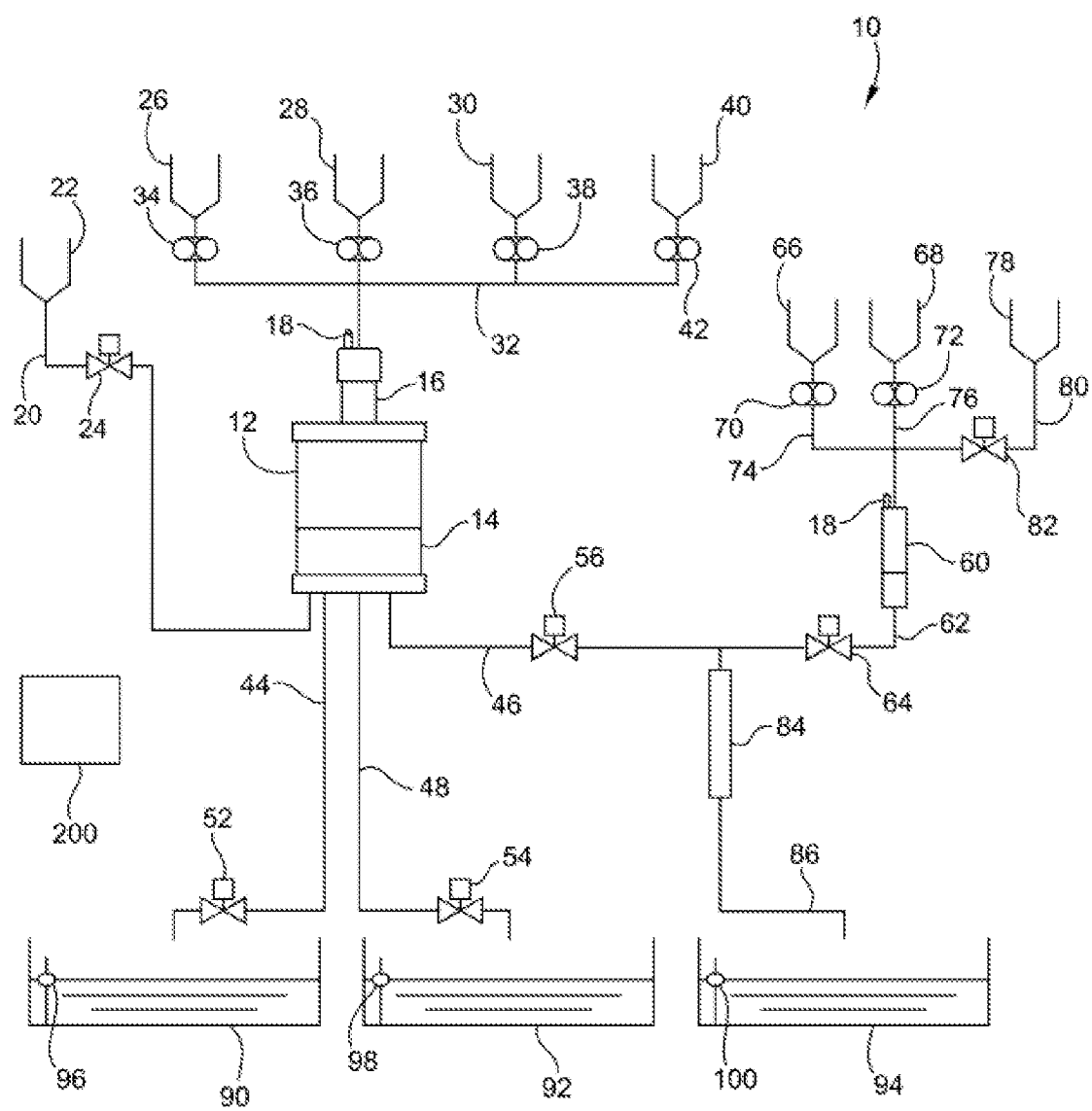
FIG. 1 is a flowchart illustrating the component features of the present invention.

Reference is made to FIG. 1, which is a flowchart, illustrating a representative system 10 of the present invention. As illustrated in FIG. 1, and for exemplary purposes only, the system 10 is used for mixing three separate formulas: formula 1, formula 2 and formula 3. For purposes of the presently described invention, formulas 1 and 2 are known as teat dips. Formula 1 a pre-dip formula described above as a "prior-to-milking" teat cleaning solution. Formula 2 is a post-dip formula described above as an "after milking harvesting solution" for post-milking hygiene and disinfection practices. Formula 3 is a more generalized "habitat" formula for general cleaning and disinfection of other animal parts or areas around the farm facility, such as, hoof hygiene, calf hygiene, animal facility hygiene, water treatment, vegetable and fruit washing, stall disinfection and the like.

Single Two-Stage Measurement Vessel 12

The on-site system 10 includes a single, two-stage measurement/mixing vessel 12 for mixing water with activator and base additives. As illustrated in FIG. 1, measurement/mixing vessel 12 is a single two-stage measurement vessel having a first lower chamber measurement vessel 14 and a second upper chamber measurement vessel 16. The mixing vessel 12 is further equipped with an ultrasonic level sensor 18, known to the art, for measuring the volume of fluid entering the mixing vessel 12.

The mixing vessel 12 is provided with a channel tube 20 for providing potable water from a water source 22 to the lower chamber measurement vessel 14. The ultrasonic sensor 18 is used to determine and measure the water level in the lower vessel 14 by providing instructions to an incoming water solenoid switch 24.

Additionally, the system 10 provides a plurality of precursor activator source vessels for providing different formulations of precursor activators to the mixing vessel 12. As will be described more fully below, the precursor activators are generally concentrated acid-based aqueous solutions that are formulated to activate a precursor base.

As illustrated in FIG. 1, there are provided three activator source vessels 26, 28, 30, which feed into an inlet channel 32 for dispensing into the mixing vessel 12 via the channel 32. Each activator source vessel comprises a unique formula of activating ingredients depending on the requirements. For example, source vessel 26 can include the activating formula necessary for producing the pre-teat dip formula 1 described above. Source vessel 28 can include the activating formula 2 necessary for producing the post-teat dip formula. Source vessel 30 can include the activating formula 3 necessary for producing the habitat formula. Each vessel 26, 28, 30 is provided with a pump 34, 36, 38, which measures the correct amount of formula to be added to the upper chamber measurement vessel 16. A variety of pumps, known to the art, can be used for this purpose. Preferably, the pump is a peristaltic pump, a type of positive displacement pump used for pumping a variety of fluids. Further, there is an additional precursor base source vessel 40 for storing a precursor base additive solution. The precursor base is generally a concentrated solution of sodium chlorite that is diluted on-site for application specific purposes. The precursor base source vessel 40 is provided with a base peristaltic pump 42 for measuring the required amounts of precursor base in the upper chamber measurement vessel 16.

The mixing vessel 12 is further provided with drain tubes for removing the solution from the mixing vessel 14 after the proper solution has been mixed. A drain tube 44 is provided for draining the formula 1 provided by the mixture of activator solution from source vessel 26 via the vessel 12. Drain tube 46 is provided for draining the formula 2 provided by the mixture of activator solution from source vessel 28. Drain tube 48 is provided for draining the formula 3 provided by the mixture of activator solution from source vessel 30. Each of the drain tubes 44, 46, 48 include a drain valve 52, 54, 56.

Single-Stage Measurement Vessel 60

For certain applications, particularly a post-dip formula which may require additional ingredients, a secondary independent single stage measurement vessel 60 is provided. In this manner, the activator solution resulting from mixing the precursor activator solution from activator source vessel 28 in the mixing vessel 12 will be further processed by admixture with the solution exiting vessel 60 via drain tube 62. A regulatory drain valve 64 is provided in drain tube 62 to monitor the flow of formula. The purpose of vessel 60 is to allow the addition of other ingredients, such as emollients and sealing agents, to the final formula. Source vessels 66, 68 provide the necessary ingredients via the actions of peristaltic pumps 70, 72 measuring the liquid ingredients into the vessel 60 by way of line tubes 74, 76. Water is provided from water source 78 via line tube 80. The quantity of water is measured by valve 82. Once the appropriate quantities of solutions from vessels 66, 68 and water from source 78 are combined in vessel 60, resulting solution is allowed to drain through line 62, via valve 64, into a static mixer 84, where the solution from vessel 60 is combined with the activator solution of vessel 12 and mixed together and ultimately drained from the static mixer into line tube 86.

Reservoirs:

Each resulting "ready-to-use" product (RTU solution) is stored in an independent reservoir that is in communication with the system's remote controller 200. The RTU solution storage system consist of storage vessels ranging in size from 50 liters to 1,000 liters, determined by the size/RTU solution storage requirements of the individual facility. Additional storage vessels may be used.

The formula resulting from source vessel 26 ultimately flows to reservoir 90 via drain tube 44. The formula resulting from source vessel 30 ultimately flows to reservoir 92 via drain tube 48. The formula resulting from source vessel 28 ultimately flows to reservoir 94 via drain tube 86. When a float switch 96, 98, 100 inside each of reservoirs 90, 92, 94 detects a low level for any of these solution products, an electronic message is passed to controller 200 to activate the corresponding system to top up the corresponding reservoir 90, 92, 94 by mixing the respective product following a pre-programmed recipe. The float switch 96, 98, 100 is in communication with the controller 200. Float switches and liquid level control sensors and relays are known to the industry. A representative example of a sensor for use in this operation is a Knight Float Switch 951-231 (Inlayout, LLC, New Orleans, La.).

As described above, the system 10 mixes the following three products:
Formula 1: pre-teat dip formula utilizing an activator solution from source vessel 26, a base solution from source vessel 40, and water from water source 22;
Formula 2: post-teat dip formula utilizing an activator solution from source vessel 28, a base solution from source vessel 40, water from water source 22, a color formula (if desired) from source vessel 66, and emollient solution from source vessel 68; and
Formula 3: a habitat formula utilizing an activator solution from source vessel 30, a base solution from source vessel 40, and water from water source 22.

As stated elsewhere, the system 10 can be adapted to provide more or fewer product formulae by either adding or removing individual source vessels. At the end of each batch, a rinse cycle containing water from water source 22 and water source 78 ensures that any remaining chemicals are flushed out of the system 10.

Programmable Logic Controller Control Panel

The system 10 includes a programmable logic controller 200, which is capable of operating water fill valves supplying the mixing tanks 12, 60 with water and operating the drain valves 52, 54, 56 and 64 to empty the mixing tanks 12, 60 into the reservoirs 90, 92, 94. In addition, the controller 200 is capable of accurately releasing small amounts of additives from source vessels 26, 28, 30 into the mixing tank 12 and small amounts of additives from source vessels 66, 68 into mixing tank 60 using the precursor peristaltic pumps 34, 36, 38, 42, 70, 72 associated with each source vessel. The controller 200 is known to the industry for similar such operations. A representative example of a controller 200 is a programmable logic controller made by Siemens SIMATIC S7-1200, with SM1231A1 ANALOG CONTROLLER (Germany).

The system has an operating temperature range from −25 to +55° C., with the same precision and reliability, making the unit suitable for enclosed outdoor use and agricultural applications.

A second communications port in the controller 200 (not illustrated) can be provided to enable SMS text messages to be sent to mobile phones, e-mails to PCs and faxes in addition to using remote maintenance functions via modem. The control unit can also communicate with other controllers or peripheral components. Security can be ensured by three-levels of password protection to prevent unauthorized access to program and process variable data.

The electronic controller panel 200 houses the system 10 controller, the system's input/output capability and the system peristaltic pumps 34, 36, 38, 42, 70, 72 that provide the precursor solutions to the measurement/mixing chambers 12, 60. By its design, the system 10 houses all electronic control mechanisms in the controller unit 200 and the measurement/blending vessels 12, 60 in a separate measurement/blending cabinet (not illustrated) which houses the two-stage chlorine dioxide measurement/mixing vessel 12 and separate measurement vessel 60 for non-activating formulations.

Operation:

Referring to FIG. 1, the controller 200 receives a low signal (closed signal) from one of the float switch level controls 96, 98, 100, thereby activating the water valve 24 to release water in the lower level 14 of the mixing tank 12 to fill the lower level 14 to the desired level with water (typically 27.5 cm, but not limited to a specific volume). Water is preferably always the first element added to the vessel 12 to ensure that the concentrated precursors are never mixed together in undiluted form.

When the water level reaches the desired level, e.g., 27.5 cm, measured by the system's ultrasonic level control sensor 18. The output in mA (milliamp) at that level is programmed in the controller 200 to turn off the water valve 24. For all products produced, the water level is typically always the same level within the measurement Vessel 12. If any other input signal from a remaining level control sensor becomes active, the signal is ignored until the first fill sequence is completed. In other words, the system ignores the other input signals, and produces ready-to-use (RTU) products on a "First come, first serve" basis. For example, if the system gets a signal from float signal 96, the system continues to keep the signal cycling until level control switch 96 indicates the reservoir 90 is filled. Then, the system 10 starts based upon the next in-line signal.

The on-site potable water supply 22 blends specially and specifically formulated precursor solutions from source vessels 26, 28, 30 within the two-stage vessel 12 to meet the pre-determined, individual hygiene requirements of the disinfectants in their RTU formulations.

After the water level has been filled, the system's controller 200 identifies the precursor, from source vessels 26, 28, 30, to be added to the vessel 12 and activates the appropriate precursor peristaltic pump. The upper chamber vessel 16 is filled to the appropriate, predetermined height with the required precursor and then blended with water from the lower chamber 14. The blended RTU formula is released from the vessel 12 and the RTU formula flows to the appropriate reservoir 90, 92 or 94 for use on-site until the system storage vessel signals that a new batch is necessary.

The system 10 repeats this process until the level controls 96, 98, 100 in the RTU reservoirs 90, 92, 94 signal to the controller 200 that the reservoir(s) is/are full. All components are in communication with the controller 200.

The present invention measures all components used in the blending process volumetrically (known to the industry as the gold standard of measurement accuracy). Systems that rely on solely on pumping mechanisms to supply individual blend constituents are susceptible to the temperature and viscosity of the individual formulations. The present invention combines the simplicity of a system pump with accuracy of a volumetric measurement system, providing the highest output with the highest accuracy. The system, through its proprietary precursor formulations and measurement/mixing vessel configuration, allows the system to produce a variety of application specific formulations at their optimum operational levels.

Precursor Solutions

The precursor solutions are specially formulated, concentrated solutions that minimize the water content of the solution, allowing the system to add on-site potable water at the time of preparation of the RTU formula. The precursor solution contents are produced to be easily and accurately pumped, measured and blended into a specified RTU solution. The RTU solutions will provide a pre-determined level of chlorine dioxide/disinfectant to meet the requirements of RTU solution's application(s).

In some applications, the "pre-dip" formula 1 solution requires 50 ml of the activator solution, 50 ml of base solution and 5000 ml of potable water from the water source to produce 250 PPM of a chlorine dioxide-based formula 1 RTU solution for storage in the reservoir 90. These solutions will generate ORP values above a 700 mV ORP reading.

For that same application, the formula 1 RTU formulation in its container may be formulated to provide 500 PPM of chlorine dioxide. That formulation would require 100 ml of formula 1 Activator and 100 ml of formula 1 Base 1000, and 5000 ml of potable water.

In different applications, such as the "post-dip" formula 2 solution, the solution may require 100 ml of formula 2 base 1000 solution and 300 ml of formula 2 activator to provide 1000 PPM of chlorine dioxide for the post milking teat formula 2 dip, along with the required emollients and sealing agents.

An exemplary set of precursor formulations can fall into three categories:
1. Precursor Activators 1, 2 and 3 in source vessels 26, 28, 30 (but not limited to 3 types of activators)—concentrated acid based aqueous solutions that are formulated to activate the Precursor Base (B) for application specific requirements;
2. Precursor Base (B) in source vessel 40, a concentrated aqueous solution of sodium chlorite that is diluted on-site for application specific requirements;
3. Precursor non-activating additives in source vessels 66, 68 (but not limited to two types of additive packages). Application specific formulations that are diluted on-site and blended with the previous mixtures to form application specific formulations.

By separating the activating mixtures from the non-activating mixtures, the invention increases accuracy of chlorine dioxide generated, increases the chlorine dioxide speed of generation, increases the chlorine dioxide yield, increases the generated chlorine dioxide stability, and increases the germicidal capacity of the generated formulations. By providing a separate measurement chamber for non-activating additive precursors the system can produce a wider range of application specific, ready-to-use formulations, more economically, on-site and not interfere with the chlorine dioxide generation process.

The systems and methods of the present invention are not limited to use and/or application within a particular setting. In some embodiments, the systems and methods of the present invention are used in agricultural animal hygiene-based settings (e.g. pre- & post milking hygiene applications).

In some embodiments the systems and methods are used are within any setting requiring use and/or application of a disinfectant. In such a system, the measurement accuracy of the precursors used in formulations and blended with water plays a critical role in the outcome of a solution.

Germicidal Composition

The present invention is not limited to the production of a germicidal active solution, such as chlorine dioxide ($ClO_2$). The produced solution is not limited to a specific PPM, ORP or pH range, or a particular disinfectant use. For example, in some embodiments the RTU solution is used for pre and/or post milking hygiene applications. In some embodiments the produced solution is used for premise hygiene purposes, such as sand/bedding cleaning and disinfection. In some embodiments it is used for water treatment and purification. Each of these formulations are designed to meet the specific requirements of the RTU solutions application.

Chlorine dioxide formulations, produced through acidified chlorite procedures, vary in strength and efficacy based upon the strength of an acid, and the additional agents within a formulation. The introduction of water provides elements, that by their nature, can influence the chlorine dioxide yield through the binding of sodium chlorite with water hardness agents. The RTU solution can be produced at PPM levels between 10 PPM and 5,000 PPM $ClO_2$. The RTU solution is not limited to a particular use or function.

Documentation has shown that the RTU formula can operate effectively with $ClO_2$ in a range of pH levels (e.g. pH levels between 4-10 range). The present invention is not limited to a particular concentration of sodium chlorite precursor or acid activator precursor, nor is it limited to a specific activator formulation. In some embodiments the sodium chlorite is an aqueous solution in concentrations of greater than 5%.

For the purpose of generating chlorine dioxide based germicidal and hygiene treatment solutions, the precursors may contain, but not be limited to, one or more acidic based formulations (activators) and concentrated aqueous based sodium chlorite (base) formulations. These activator/base formulations are concentrated versions and must be mixed on-site, with on-site water added, to produce chlorine dioxide-based treatment solutions. The precursors, comprising of one or more system activator solutions to be used to blend with a system base, comprised of, but not limited to an aqueous concentrated sodium chlorite solution. The present invention is not limited to a particular concentration of sodium chlorite precursor or acid activator precursor, nor is it limited to a specific activator formulation. In some embodiments the sodium chlorite is an aqueous solution in concentrations of greater than 5%.

For the purpose of generating chlorine dioxide based germicidal and hygiene treatment solutions, the precursors may contain, but not be limited to, one or more acidic based formulations (activators) and concentrated aqueous based sodium chlorite (base) formulations. These activator/base formulations must be mixed on-site to produce chlorine dioxide-based treatment solutions. The precursors, comprising of one or more system Activator solutions to be used to blend with a system Base, comprised of, but not limited to an aqueous concentrated sodium chlorite solution.

Chlorine dioxide can be used as oxidizer or disinfectant. It is a very strong oxidizer and it effectively kills pathogenic microorganisms such as fungi, bacteria and viruses. It also prevents and removes bio film. As a disinfectant, it is mainly used in liquid form. Chlorine dioxide can also be used against anthrax, because it is effective against spore-forming bacteria. As an oxidizer chlorine dioxide is very selective. It has this ability due to unique one-electron exchange mechanisms. Chlorine dioxide attacks the electron-rich centers of organic molecules. One electron is transferred, and chlorine dioxide is reduced to chlorite (ClO2-).

Figure 2:
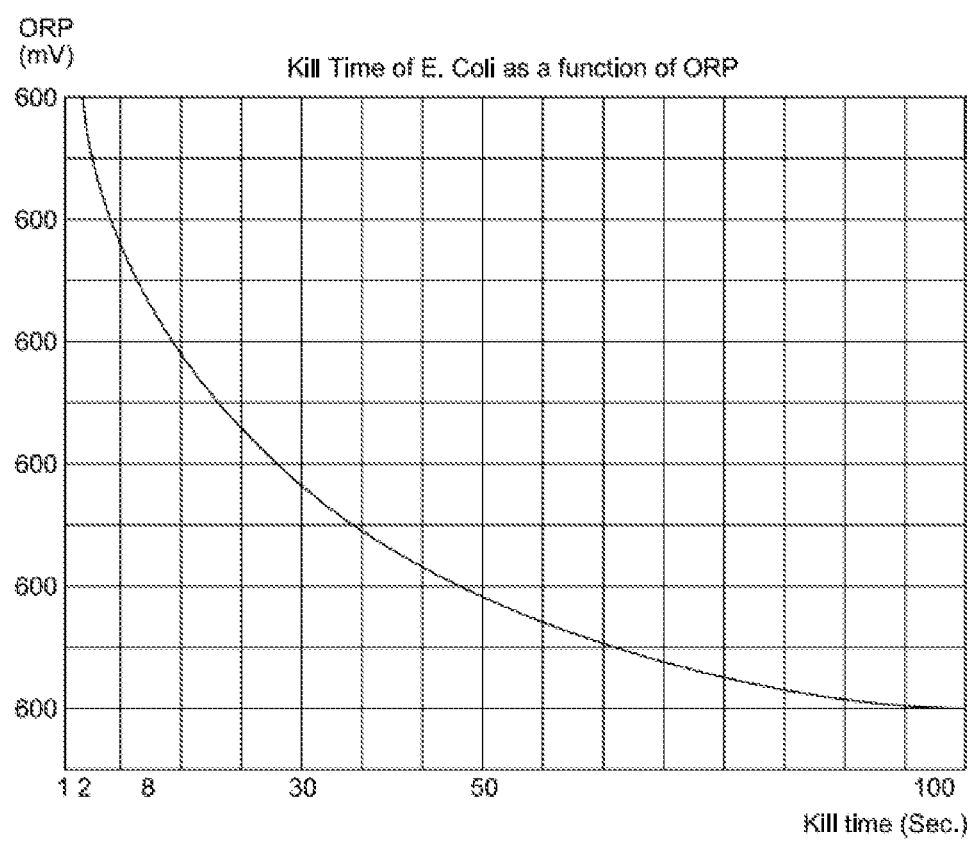
FIG. 2 is a graph which shows the relationship between a solution's oxidation reduction potential (ORP) value and kill time of *E. coli*.

The strength of the activated chlorine dioxide solution can be measured in PPM and ORP. A solution's ORP value is measured in millivolts (mV), providing a standardized approach to identifying a solution's germicidal value. FIG. 2 shows the relationship between a solution's ORP value and kill time of E. coli.

Producing chlorine dioxide solutions, with higher yield conversions between the activator precursors and the base precursors, thus achieving higher ORP and PPM readings, is an important part of the design of the system hardware and precursor development. Each activator/base precursor produced is diluted on-site with an on-site water source to meet individual RTU formulation needs. Knowing that those formulations are influenced by non-activating components allows the formulations to be produced in an optimized fashion. The formulation components and their sequence of mixture also affect the solutions germicidal capability, measured in both PPM and ORP readings, thus the precursor formulations, and the sequence in which they are mixed, play an important role in a product's efficacy, stability and application specific requirements.

Representative System for a Milking Operation

As an example, a pre-milking hygiene treatment solution may be produced in the system at PPM levels of chlorine dioxide in the 100-500 PPM range, where as a post milking treatment formulation may be produced at a range of 500-1,000 PPM. A water treatment solution may be produced at 10 PPM. The system of the present invention can automatically produce the complete range of treatment solutions, as determined by the individual facility requirements.

Thus, the system has the ability to produce a range of treatment solutions that are pre-defined by the requirements of the treatment's individual application, as an example, a pre-milking chlorine dioxide treatment used through milking teat scrubber known to the art, or a treatment solution used for post milking teat protection application. Through the system, and the pre-determined precursor formulations, the system can produce treatment solutions individually tailored to a facility's requirements.

Individual precursor formulations are developed to use the system for the on-site production of the individual treatment solutions. The system has the ability to vary the individual treatment formulations to be specific to the requirements of the individual on-site needs; as an example the system can be set to vary the individual PPM levels or the pre-milking cleaning and sanitizing solutions between 100-500 PPM, and vary the individual post milking treatment solutions between 500-1000 PPM by adjusting the peristaltic pump run times and speeds, and the measurement vessel liquid level sensors to the desired levels. This allows each system to be set to the individual requirements of the site and environment that it operates in.

In some embodiments, the pre-milking hygiene solution is generated by combining the aqueous sodium chlorite solution with potable water, a detergent component, an acid component and other antimicrobial components (e.g. dodecyl benzene sulfonic acid (DDBSA), Chloroxylenol (PCMX) and/or quaternary ammonia). The invention is not limited to specific additives, concentrations of additives, or combinations of additives.

EXAMPLES

Example: As an example, the precursor solutions, when diluted with water, may create treatment solutions for storage that range from 10 parts per million (PPM) of chlorine dioxide to 2,000+PPM, or more of chlorine dioxide;

Example: As an example, a pre-milking hygiene treatment solution may be produced in the system at PPM levels of chlorine dioxide in the 200-500 PPM range, where as a post milking treatment formulation may be produced at a range of 500-1,000 PPM. A water treatment solution may be produced at 10 PPM. The system can automatically produce the complete range of treatment solutions, as determined by the individual facility requirements.

Any version of any component or method step of the invention may be used with any other component or method step of the invention. The elements described herein can be used in any combination whether explicitly described or not.

All combinations of method steps as used herein can be performed in any order, unless otherwise specified or clearly implied to the contrary by the context in which the referenced combination is made.

As used herein, the singular forms "a," "an," and "the" include plural referents unless the content clearly dictates otherwise.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All patents, patent publications, and peer-reviewed publications (i.e., "references") cited herein are expressly incorporated by reference in their entirety to the same extent as if each individual reference were specifically and individually indicated as being incorporated by reference. In case of conflict between the present disclosure and the incorporated references, the present disclosure controls.

The devices, methods, compounds and compositions of the present invention can comprise, consist of, or consist essentially of the essential elements and limitations described herein, as well as any additional or optional steps, ingredients, components, or limitations described herein or otherwise useful in the art.

While this invention may be embodied in many forms, what is described in detail herein is a specific preferred embodiment of the invention. The present disclosure is an exemplification of the principles of the invention is not intended to limit the invention to the particular embodiments illustrated. It is to be understood that this invention is not limited to the particular examples, process steps, and materials disclosed herein as such process steps and materials may vary somewhat. It is also understood that the terminology used herein is used for the purpose of describing particular embodiments only and is not intended to be limiting since the scope of the present invention will be limited to only the appended claims and equivalents thereof.

BIBLIOGRAPHY

Gates, Don PhD., (1998) *The Chlorine Dioxide Handbook*, American Water Works Association.

Schroeder (2012) *Bovine Mastitis and Milking Management*, North Dakota State University, Fargo, N. Dak.

Suslow, Trevor, University of California, Davis, "Post Harvest Quality and Safety from Seed to Shelf

What is claimed is:

1. An on-site system for producing at least two distinct ready-to-use product solutions, comprising:
   a. a plurality of pumps for pumping at least two independent precursor solutions into a first measurement/mixing vessel;

b. a programmable logic controller, comprising:
   i. an on/off indicator switch for activating the on-site system; and
   ii. a signal control board for determining the type and amount of ready-to-use product solutions to be produced and the associated precursor solution to be pumped in the first measurement/mixing vessel;
c. the first measurement/mixing vessel for mixing water with the precursor solutions, the first measurement/mixing vessel comprising:
   i. a first chamber measurement vessel for receiving the precursor solutions;
   ii. a second lower chamber measurement vessel for receiving water, wherein the first and second measurement vessels comprise inlets for receiving the precursor solutions and the water;
   iii. an ultrasonic fill-level sensor for accurately determining and measuring the quantity of the precursor solutions and water in the first measurement/mixing vessel;
   iv. an incoming water source connected to a channel tube, including a water solenoid switch, for measuring the flow of water into the first measurement/mixing vessel; and
   v. a plurality of system drain switches for releasing the ready-to-use product solutions from the first measurement/mixing vessel;
d. a plurality of precursor source vessels wherein each precursor source vessel contains a distinct precursor solution and wherein each precursor source vessel is connected to one of the plurality of pumps for pumping the precursor solution into the measurement/mixing vessel; and
e. a plurality of reservoirs for collecting the ready-to-use product solutions generated from the first measurement/mixing vessel.

2. The system of claim 1 wherein the pumps are peristaltic pumps.

3. The system of claim 1 wherein the precursor solutions are cleaning solutions.

4. The system of claim 3 wherein the precursor cleaning solutions are activator and base additives.

5. The system of claim 1 further comprising a second measurement/mixing vessel for receiving water from the water source and precursor solutions from the precursor source vessels, the system further comprising at least one auxiliary source vessel for providing supplementary solutions to the ready-to-use solution.

6. The system of claim 5 wherein the supplementary solutions are selected from the group consisting of color additives, emollients and sealing agent additives for certain ready-to-use product solution formulations.

7. The system of claim 6 further comprising a static mixer for blending the precursor solutions, supplementary solutions and water together.

8. The system of claim 1 wherein the ready-to-use solutions are cleaning or germicidal solutions.

9. The system of claim 1 wherein the ready-to-use product solutions comprise chlorine dioxide hygiene formulations.

10. The system of claim 1 wherein the ready-to-use product solutions are selected from the group consisting of pre-milking teat disinfectants, post-milking teat disinfectants, hoof hygiene disinfectants, calf hygiene disinfectants, animal/facility hygiene disinfectants, water treatment solutions, and vegetable and fruit washing solutions.

11. The system of claim 1 comprising three activator source vessels and a base source vessel for dispensing activator and base additives into the first mixing/measurement vessel, wherein each activator additive is a unique solution.

12. The system of claim 11 wherein the base additive is a concentrated solution of sodium chlorite.

13. The system of claim 1 wherein each reservoir comprises a float switch for measuring the current level of ready-to-use product solution in the reservoir, wherein the float switch is in communication with the controller.

14. An on-site system for producing at least two distinct ready-to-use product solutions, comprising:
   a. a plurality of peristaltic pumps for pumping at least two independent precursor solutions, wherein the precursor solutions comprise activator and base additives, into a first measurement/mixing vessel;
   b. a programmable logic controller, comprising:
      i. an on/off indicator switch for activating the on-site system; and
      ii. a signal control board for determining the type and amount of ready-to-use product solutions to be produced and the associated precursor solution to be pumped in the first measurement/mixing vessel;
   c. a plurality of precursor source vessels wherein each precursor source vessel contains a distinct precursor solution and wherein each precursor source vessel is connected to one of the plurality of peristaltic pumps for pumping the precursor solution into the measurement/mixing vessel;
   d. the first measurement/mixing vessel for mixing water with the precursor solutions, the first measurement/mixing vessel comprising:
      i. a first chamber measurement vessel for receiving the precursor solutions;
      ii. a second lower chamber measurement vessel for receiving water, wherein the first and second measurement vessels comprise inlets for receiving the precursor solutions and the water;
      iii. an ultrasonic fill-level sensor for accurately determining and measuring the quantity of the precursor solutions and water in the first measurement/mixing vessel;
      iv. an incoming water source connected to a channel tube, including a water solenoid switch, for measuring the flow of water into the first measurement/mixing vessel; and
      v. a plurality of system drain switches for releasing the ready-to-use product solutions from the first measurement/mixing vessel;
   e. a second measurement/mixing vessel for receiving water from the water source and precursor solutions from the precursor source vessels, the system further comprising at least one auxiliary source vessel for providing supplementary solutions to the ready-to-use solution; and
   f. a plurality of reservoirs for collecting the ready-to-use product solutions generated from the first measurement/mixing vessel, wherein each of the reservoirs comprises a float switch for measuring the current level of ready-to-use product solution in the reservoirs, wherein the float switch is in communication with the controller.

15. The system of claim 14 wherein the supplementary solutions are selected from the group consisting of color additives, emollients and sealing agent additives for certain ready-to-use product solution formulations.

16. The system of claim 14 further comprising a static mixer for blending the precursor solutions, supplementary solutions and water together.

17. The system of claim 14 wherein the ready-to-use product solutions are selected from the group consisting of pre-milking teat disinfectants, post-milking teat disinfectants, hoof hygiene disinfectants, calf hygiene disinfectants, animal/facility hygiene disinfectants, water treatment solutions, and vegetable and fruit washing solutions.

* * * * *